United States Patent [19]

Gonzalez

[11] Patent Number: 5,078,172
[45] Date of Patent: Jan. 7, 1992

[54] SEISMIC ACTUATOR

[76] Inventor: Ernest R. Gonzalez, 33761 The Street of the Blue Lantern, Dana Point, Calif. 92629

[21] Appl. No.: 672,362

[22] Filed: Mar. 20, 1991

[51] Int. Cl.$^5$ .............................................. F16K 17/36
[52] U.S. Cl. .......................................... 137/38; 74/2; 200/61.45 R
[58] Field of Search .................. 74/2; 137/38, 39, 45; 200/61.45 R, 61.52

[56] References Cited

U.S. PATENT DOCUMENTS

| 3,805,818 | 4/1974 | Yamada | 137/38 |
| 4,103,697 | 8/1978 | Kiesow | 137/45 |
| 4,107,545 | 8/1978 | Gittelis | 200/61.45 R X |
| 4,261,379 | 4/1981 | Berry | 137/39 |
| 4,971,094 | 11/1990 | Gonzalez | 137/38 |

Primary Examiner—Robert G. Nilson
Attorney, Agent, or Firm—Loyal M. Hanson

[57] ABSTRACT

A device for controlling an earthquake-vulnerable or other operation according to seismic activity, such as the flow of water from a reservoir or natural gas to users, includes a control unit for controlling the operation when actuated by a predetermined triggering movement, an actuator unit for producing the triggering movement when the actuator unit is subjected to a threshold level of seismic activity, and a coupling unit for coupling the triggering movement from the actuator unit to the control unit. Mounting components are provided for mounting the coupling unit on the control unit and the actuator unit on the coupling unit so that a user can adjustably set the position of the actuator unit relative to the control unit in order to level the actuator unit in two different directions. One embodiment includes a first clamped flange for mounting the coupling unit on the control unit so that a user can pivot the position of the coupling unit relative to the control unit about a first axis, and a second clamped flange for mounting the actuator unit on the coupling unit so that a user can pivot the position of the actuator unit relative to the coupling unit about a second axis. Hydraulic or electrical control units may be used.

16 Claims, 2 Drawing Sheets

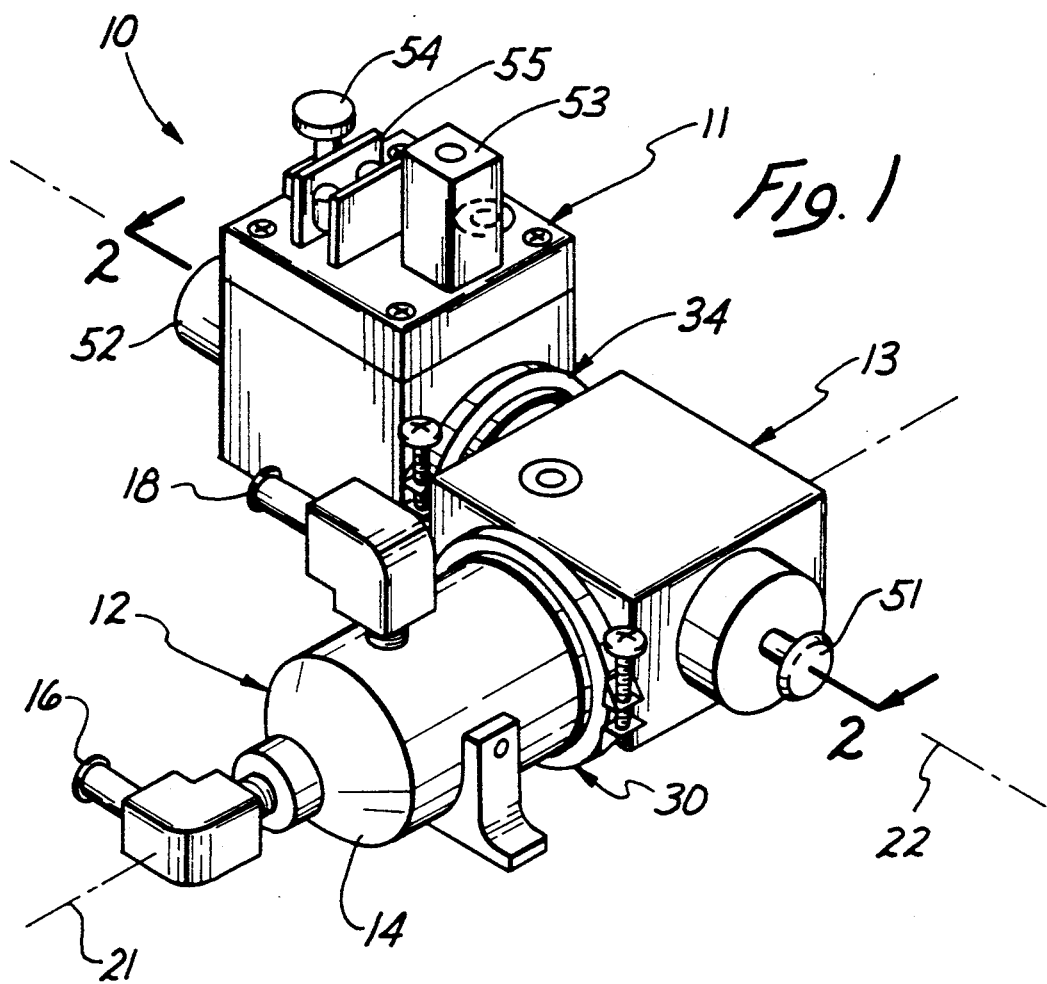
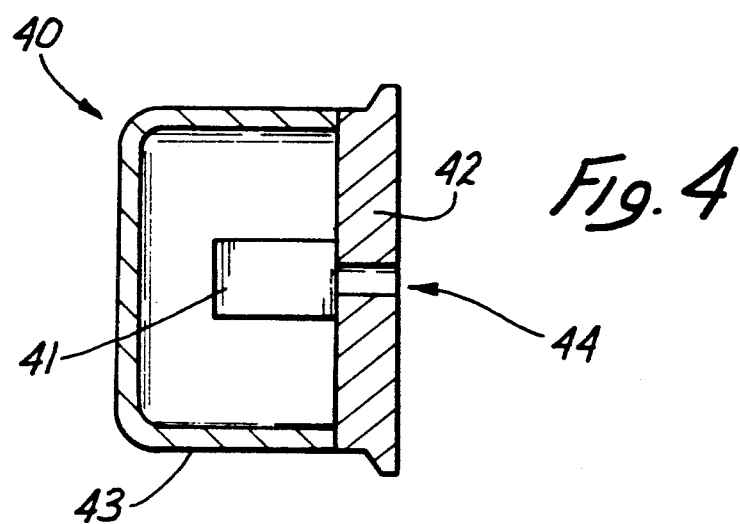

SEISMIC ACTUATOR

BACKGROUND OF THE INVENTION

1. Technical Field

This invention relates generally to control systems that automatically respond to seismic activity or other such accelerated movement, and more particularly to a seismic actuator device for such a system.

2. Background Information

A seismic actuator may control such earthquake-vulnerable operations as the flow of water from reservoirs or natural gas to users. When seismic activity accelerates the actuator sufficiently, a movably mounted weight trips a trigger mechanism within the actuator. The trigger mechanism then actuates control componentry that operates safety valves or other emergency equipment.

But existing actuators have certain drawbacks. To see why, recall that an actuator must remain level for the movably mounted weight to remain free to operate properly. So the installer must mount the actuator carefully. But the practice of mounting the actuator on an existing structure, such as a pipeline or a valve, can complicate the process because the existing structure may not be oriented just right. Thus, the installer must carefully customize the installation. Moreover, the orientation of the supporting structure may slowly change and thereby necessitate readjustment from time to time.

The safety valve described in U.S. Pat. No. 4,971,094 alleviates the problem somewhat. It includes an actuator unit that is adjustably mounted on a valve unit (i.e., a control unit). The installer connects the valve unit to an existing structure, such as a pipeline. By operating a clamped flange arrangement, the installer then pivots the actuator unit relative to the valve unit in order to help level the actuator unit.

But that arrangement may still necessitate adjustment of the valve unit relative to the pipeline on which it is mounted to completely level the actuator unit. Doing so may be somewhat difficult and time-consuming, especially for later readjustment. Thus, a better actuator arrangement is desirable.

SUMMARY OF THE INVENTION

This invention solves the problems outlined above by providing an actuator device having three interconnected units—an actuator unit, a coupling unit, and a control unit. They are adjustably interconnected to enable leveling of the actuator unit in each of two directions. That arrangement enables a user to completely level the actuator unit in a horizontal plane without regard for the precise orientation of the existing structure on which the control unit is mounted.

Generally, a device constructed according to the invention includes an actuator unit, a control unit, and a coupling unit. The control unit control is configured to control a particular operation (e.g., hydraulically or electrically) when actuated by a predetermined triggering movement. The actuator unit produces the triggering movement when the actuator unit is subjected to a preset threshold level of seismic activity, and the coupling unit couples the triggering movement from the actuator unit to the control unit.

According to a major aspect of the invention, there are provided mounting components for mounting the coupling unit on the control unit and the actuator unit on the coupling unit. They are configured in such a way that a user can adjustably set the position of the actuator unit relative to the control unit in order to level the actuator unit in two different directions. That enables complete leveling in a horizontal plane despite control unit orientation, which may depend on the orientation of a reservoir valve or other supporting structure on which the control unit is mounted.

Preferably, a first clamped flange arrangement mounts the coupling unit on the control unit so that a user can pivot the position of the coupling unit relative to the control unit about a first axis. In addition, a second clamped flange arrangement mounts the actuator unit on the coupling unit so that a user can pivot the position of the actuator unit relative to the coupling unit about a second axis. The user loosens the clamps, levels the actuator, and then retightens the clamps.

One embodiment includes a ninety degree coupling unit disposed along intersecting first and second axes. In another embodiment, the control unit takes the form of a hydraulic valve while in another it takes the form of an electrical switch. The electrical switch control unit may be configured to enable direct connection to the actuator unit without using the coupling unit for applications where leveling requirements are less severe. Other features include a triggering solenoid and a reset solenoid for remote operation, a sensitivity adjustment, and a status indicator for remote status checking of the actuator unit.

The foregoing and other objects and features of the invention will become more apparent upon reading the following detailed description with reference to the illustrative drawings.

BRIEF DESCRIPTION OF THE DRAWINGS

FIG. 1 of the drawings is an isometric view of a seismic actuator device constructed according to the invention that includes a control unit in the form of a hydraulic valve;

FIG. 4 is a cross sectional view of an electrical switching control section.

DESCRIPTION OF THE PREFERRED EMBODIMENTS

Figure 2:
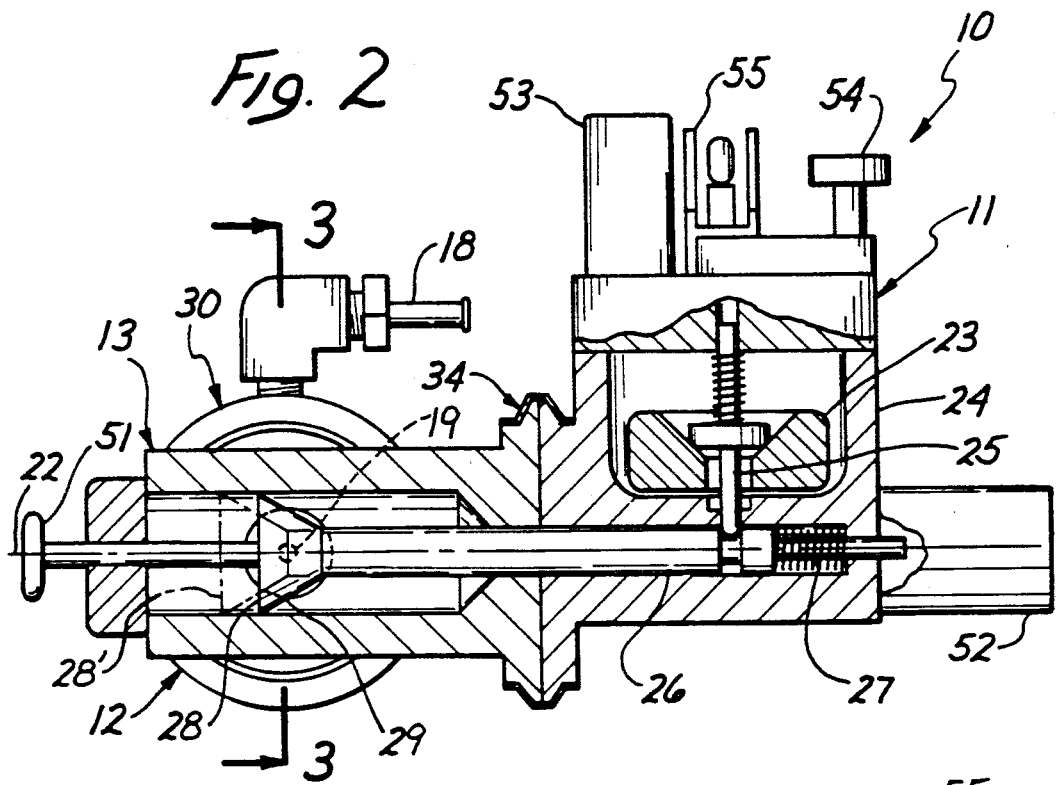
FIG. 2 is an enlarged cross sectional view of the device taken on line 2—2 of FIG. 1 showing the actuator unit in an untriggered position such that the hydraulic valve is in a closed position; device

The drawings show a seismic actuator device 10 constructed according to the invention. Generally, the device 10 includes an actuator unit 11, a control unit 12, and a coupling unit 13. The control unit 12 is configured to control an operation when it is actuated by a predetermined triggering movement, the actuator unit 11 is configured to produce the triggering movement when the actuator unit 11 is subjected to a threshold level of seismic activity, and the coupling unit 13 is configured to couple the triggering movement from the actuator unit 11 to the control unit 12.

Although those components may take any of various forms within the broader inventive concepts disclosed, the illustrated control unit 12 is configured with a poppet 15 (FIG. 3) that is spring-biased toward the illustrated open position. That enables fluid to flow from an inlet 16 through a hollow interior 17 of a housing 14 and out of an outlet 18 as indicated by the arrows in FIG. 3.

Figure 3:
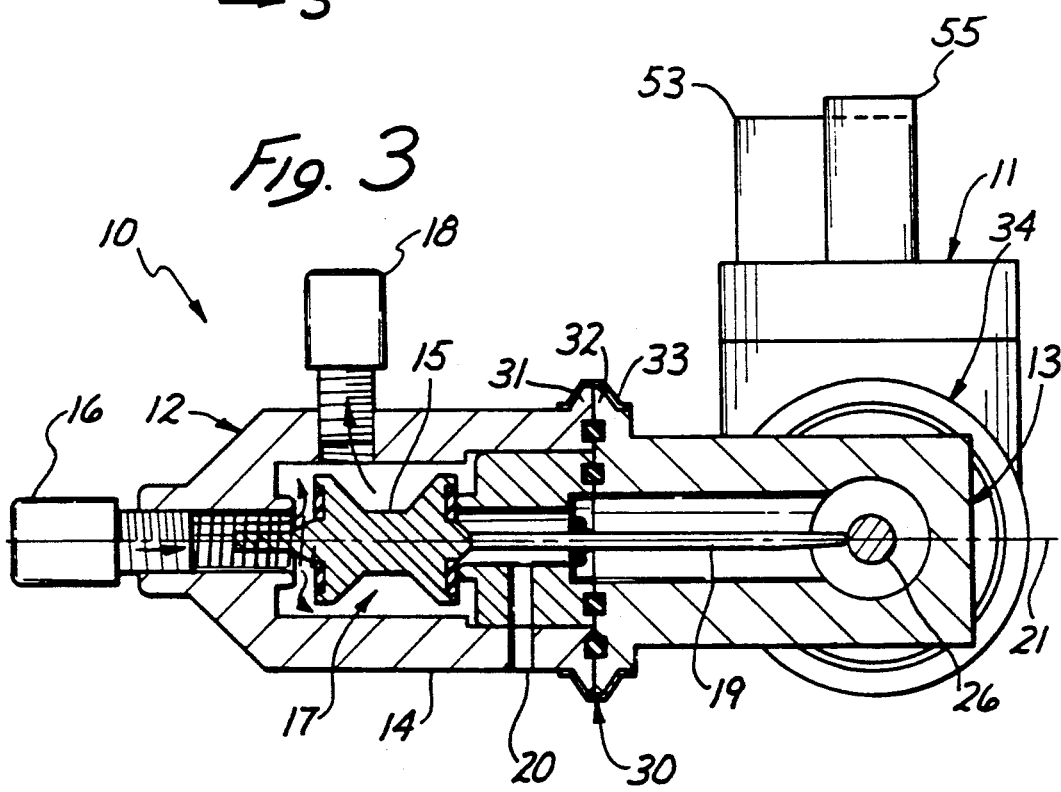
FIG. 3 is a cross sectional view of the device taken on line 3—3 of FIG. 2, but with the actuator unit triggered so that the hydraulic valve is in an open position corresponding to the cam element position shown in phantom lines in FIG. 2.

As subsequently discussed, the poppet 15 is normally held in a closed position by a shaft 19 (FIGS. 2 and 3). In the closed position, the poppet 15 is disposed toward the inlet 16 sufficiently to block the flow of liquid into the hollow interior from the inlet 16. In addition, a backflow of liquid from the outlet 18 can flow through the hollow interior 17 and out an exhaust port 20 when the poppet 15 is in the closed position.

But when triggering movement is applied to the poppet 15 by the shaft 19 moving axial away from the inlet 16 along an axis 21, the poppet 15 moves from the closed position to the illustrated open position (FIG. 3). Thus, triggering movement of the shaft 19 switches the control unit 12 from the closed position to the open position. So, the control unit 12 can be used to control the flow of fluid through a hydraulic line connected to the inlet 16 and the outlet 18 in order that fluid flowing in the hydraulic line can be used to close a hydraulically operated valve arranged to control an earthquake-vulnerable or other important operation, such as the flow of water through a pipeline from a reservoir or the flow of natural gas through pipelines to customers. In the event of an earthquake, the control unit 12 opens in order to actuate (close) the hydraulically operated valve and thereby stop the flow of water or natural gas. In other words, the control unit 12 opens to close down the earthquake-vulnerable operation being controlled.

The actuator unit 11 produces the triggering movement along an axis 22 (FIGS. 1 and 2) substantially perpendicular to the axis 21. It uses known triggering componentry that is sensitive to acceleration (such as may accompany seismic activity of concern). More specifically, a movably mounted weight 23 within the hollow interior of a housing 24, responds to a threshold level of acceleration by moving a trigger member 25 that releases a spring-loaded shaft 26 (FIG. 2). That results in the shaft 26 moving axially along the axis 22 under influence of a compressed spring 27.

The coupling unit 13 couples the triggering movement from the shaft 26 to the shaft 19, For that purpose, the shaft 26 includes a cam element in the form of a conically shaped portion 28 (or separate attached member) that provides a cam surface 29 (FIG. 2). The shaft 19 rides on the cam surface 29 so that, as the shaft 26 moves under influence of the spring 27, the conically shaped portion 28 moves toward the position shown in phantom lines in FIG. 2 at reference numeral 28'. As a result, the shaft 19 moves away from the inlet 16 to the position shown in FIG. 3. With that triggering movement, the poppet 15 moves from the closed position to the open position illustrated in FIG. 3, thereby placing the inlet 16 and outlet 18 in fluid communication while blocking the flow of fluid out of the discharge port 20.

The coupling unit 13 also supports the actuator unit 11 on the control unit 12. For that purpose, the device 10 includes means for mounting the coupling unit 13 on the control unit 12 and the actuator unit 11 on the coupling unit 13. That is done so that a user can adjustably set the position of the actuator unit 11 relative to the control unit 12 in order to level the actuator unit 11 in two different horizontal directions so that the actuator unit 11 is level in a horizontal plane.

First mounting means in the form of a clamped flange arrangement 30 mounts the coupling unit 13 on the control unit 12 so that a user can pivot the position of the coupling unit relative to the control unit about a first axis (e.g., the axis 21 in FIGS. 1 and 3). The clamped flange arrangement 30 includes a first flange 31 on the control unit 12, a second flange 32 on the coupling unit 13, and a clamp 33 (FIG. 3). The clamp 33 may be any of various known types of band clamps or other suitable arrangements for clamping the flanges 31 and 32 together. The user loosens the clamp 33, adjusts the relative position of the coupling unit 13 relative to the control unit 12, and then tightens the clamp 33.

Second mounting means in the form of a second clamped flange arrangement 34 mounts the actuator unit 11 on the coupling unit 13 so that a user can pivot the position of the actuator unit 11 relative to the coupling unit 13 about a second axis (e.g., the axis 22 in FIGS. 1 and 2). It may be configured so that it is generally similar to the clamped flange arrangement 30. Of course, any of various mounting arrangements may be used within the broader inventive concepts disclosed to enable the adjustment desired.

Considering now FIG. 4, it illustrates an electrical switching control unit 40 that can be used instead of the hydraulic control unit 12. It includes an electrical switch 41 mounted on a flange structure 42 that mates with a flange on the coupling unit 13. The switch 41 is covered by a suitable covering structure 43, and the flange structure 42 defines an opening 44 through which the shaft 19 extends in order to transmit the triggering movement to the switch 41. The flange structure 42 may be configured to mate with a flange on the actuator unit 11 so that the coupling unit 13 can be omitted. In that event, a suitably configured shaft is substituted for the shaft 26 to transmit the triggering movement from the actuator unit 11 to the switch 41.

In addition to the foregoing, the device 10 may include a manual reset shaft 51 (FIGS. 1 and 2. The user pushes the shaft 51 to reset the actuator unit 11. A reset solenoid 52 (FIGS. 1 and 2) operates electrically to enable remote resetting. A triggering solenoid 53 (FIGS. 1-3) operates electrically to enable remote triggering. A sensitivity adjustment 54 (FIGS. 1 and 2) provides for manual adjustment of the sensitivity of the actuator unit 11. A switch 55 (FIGS. 1-3) provides an indication of whether or not the actuator unit 11 is triggered. And as an idea of size, the illustrated device 10 can fit with a 6"×7"×11" box. Of course, those dimensions are not critical.

Thus, the invention provides an actuator device having three interconnected units that are adjustably interconnected to enable leveling of the actuator unit in each of two directions. That arrangement enables a user to completely level the actuator unit in a horizontal plane without regard for the precise orientation of the existing structure on which the control unit is mounted.

Although the device 10 is described in terms of "seismic activity," that term is intended to include any event resulting in acceleration of the device sufficient to cause the actuator unit to produce the triggering action (e.g., explosions, collisions, bombings, etc.), and it is intended that the specification and claims be so interpreted. Furthermore, a device constructed according to the invention may be configured to control any of various operations other than controlling the flow of water or gas. It may, for example, be configured to control the flow of petrochemicals, hazardous gases, or electrical power, or to provide switching control of most any conceivable operation, including the activation of an alarm.

Although an exemplary embodiment has been shown and described, many changes, modifications, and substitutions may be made by one having ordinary skill in the art without necessarily departing from the spirit and scope of the invention.

What is claimed is:

1. A device for automatically controlling an operation according to seismic activity, the device comprising:
   means defining a control unit for controlling an operation when the control unit is actuated by a predetermined triggering movement;
   means defining an actuator unit for producing the triggering movement when the actuator unit is subjected to a threshold level of seismic activity;
   means defining a coupling unit for coupling the triggering movement from the actuator unit to the control unit; and
   means for mounting the coupling unit on the control unit and the actuator unit on the coupling unit so that a user can adjustably set the position of the actuator unit relative to the control unit in order to level the actuator unit in two different directions.

2. A device as recited in claim 1, wherein the means for mounting the coupling unit includes:
   first mounting means for mounting the coupling unit on the control unit so that a user can pivot the position of the coupling unit relative to the control unit about a first axis; and
   second mounting means for mounting the actuator unit on the coupling unit so that a user can pivot the position of the actuator unit relative to the coupling unit about a second axis.

3. A device as recited in claim 2, wherein the first and second axes intersect.

4. A device as recited in claim 2, wherein the first and second axes are substantially perpendicular.

5. A device as recited in claim 2, wherein the second axis is substantially vertical when the actuator unit is in a level position.

6. A device as recited in claim 2, wherein at least one of the first and second coupling means includes a clamped flange arrangement.

7. A device as recited in claim 1, wherein the control unit includes a hydraulic valve responsive to the triggering movement.

8. A device as recited in claim 1, wherein the control unit includes an electrical switch responsive to the triggering movement.

9. A device as recited in claim 8, wherein the actuator unit and control unit are configured to enable them to be directly interconnected without using the coupling unit.

10. A device as recited in claim 1, wherein the coupling unit includes:
    means defining a first elongated member disposed and mounted for axial movement along a first axis for transmitting the triggering movement along the first axis;
    means defining a second elongated member disposed and mounted for movement along a second axis that is intersecting and substantially perpendicular to the first axis for transmitting the triggering movement along the second axis; and
    means defining a cam surface on the second elongated member for coupling the triggering movement from the second elongated member to the first elongated member.

11. A device as recited in claim 10, wherein the means defining a cam surface includes a conically shaped member on the second elongated member.

12. A device as recited in claim 1, further comprising means defining a triggering solenoid for remotely operating the actuator unit.

13. A device as recited in claim 1, further comprising means defining a reset solenoid for remotely resetting the actuator unit.

14. A device as recited in claim 1, further comprising means defining a sensitivity adjustment for adjusting the threshold level at which the actuator unit produces the triggering movement.

15. A device as recited in claim 1, further comprising means defining a status indicator switch for enabling remote status checking of the actuator unit.

16. A device for automatically controlling an operation according to seismic activity, comprising:
    a control unit, an actuator unit, and a coupling unit, the control unit being configured to control a particular operation when actuated by a predetermined triggering movement, the actuator unit being configured to produce the triggering movement when the actuator unit is subjected to a threshold level of seismic activity, and the coupling unit being configured to coupled the triggering movement from the actuator unit to the control unit while supporting the actuator unit on the control unit;
    first mounting means for mounting the coupling unit on the control unit so that a user can pivot the position of the coupling unit relative to the control unit about a first axis; and
    second mounting means for mounting the actuator unit on the coupling unit so that a user can pivot the position of the actuator unit relative to the coupling unit about a second axis.

* * * * *